US007765118B1

(12) United States Patent
Bohanek

(10) Patent No.: US 7,765,118 B1
(45) Date of Patent: *Jul. 27, 2010

(54) SYSTEMS AND METHODS FOR INSURANCE COVERAGE

(75) Inventor: Robert Michael Bohanek, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,611

(22) Filed: Oct. 17, 2008

Related U.S. Application Data

(62) Division of application No. 12/145,648, filed on Jun. 25, 2008.

(51) Int. Cl.
*G06Q 10/00* (2006.01)
(52) U.S. Cl. .................... 705/4; 705/14.72; 705/27; 705/29
(58) Field of Classification Search .............. 705/2–4, 705/14.72, 27, 29
See application file for complete search history.

(56) References Cited

U.S. PATENT DOCUMENTS

| 7,035,813 | B1 * | 4/2006 | Cook ................... 705/16 |
| 7,200,566 | B1 | 4/2007 | Moore et al. |
| 7,464,059 | B1 | 12/2008 | Robinson et al. |
| 2002/0042727 | A1 | 4/2002 | Soramoto et al. |
| 2002/0095373 | A1 | 7/2002 | Melchior et al. |
| 2002/0169671 | A1 * | 11/2002 | Junger ................... 705/14 |
| 2004/0153347 | A1 | 8/2004 | Kunze et al. |
| 2004/0215484 | A1 * | 10/2004 | McKnight et al. ........... 705/1 |
| 2006/0059088 | A1 | 3/2006 | Krikorian et al. |
| 2007/0214021 | A1 | 9/2007 | McLaughlin |

OTHER PUBLICATIONS

"Unleash Your Consumer Power; American Express Offers Free Brochures to Help You Protect Your Purchases" (Press Release Jan. 27, 1999.*
"Checking Accounts Offer Buyer-Protection Insurance" by Michael Quint, New York Times, Late editions—Final ED; col. 1, p. 1, Feb. 12, 1990.*
Grami, Ali et al., "Future Trends in Mobile Commerce: Service Offerings, Technological Advances and Security Challenges", Faculty of Business and Information Technology—University of Ontario Institute of Technology. 14 pages.

* cited by examiner

*Primary Examiner*—Vivek D Koppikar
(74) *Attorney, Agent, or Firm*—Townsend and Townsend and Crew LLP

(57) ABSTRACT

A user may use a financial card to make a purchase at a merchant. An institution system may receive and analyze transaction data associated with the purchase. The institution system may send a notice to the user asking if the user would like insurance coverage for the item(s) pertaining to the purchase. The notice may request the user send a photo of the item(s) or documentation pertaining to the item(s) to the institution system.

21 Claims, 6 Drawing Sheets

US 7,765,118 B1

SYSTEMS AND METHODS FOR INSURANCE COVERAGE

CROSS-REFERENCE TO RELATED APPLICATIONS

The present application is a divisional patent application of U.S. patent application Ser. No. 12/145,648 filed Jun. 25, 2008, the entirety of which is hereby incorporated by reference herein. Further, this application is related by subject matter to that disclosed in the following commonly assigned application, the entirety of which is hereby incorporated by reference herein: U.S. patent application Ser. No. 12/253,642, filed concurrently herewith and entitled "SYSTEMS AND METHODS FOR INSURANCE COVERAGE".

BACKGROUND

Insurance is a form of risk management primarily used to hedge against the risk of a contingent loss, and may be defined as the equitable transfer of the risk of a loss, from one entity to another, in exchange for a premium. An insurer is a company that sells insurance. An insurance rate is a factor used to determine the amount, called the premium, to be charged for a certain amount of insurance coverage. Considerable delay often occurs between the time a user purchases an item that the user may want to have covered by insurance and the time when the item is covered by the insurance by the insurer.

SUMMARY

A user may use a financial card to make a purchase at a merchant. An institution system may receive and analyze transaction data associated with the purchase. The institution system may send a notice to the user asking if the user would like insurance coverage for the item(s) pertaining to the purchase. The notice may request the user send a photo of the item(s) or documentation pertaining to the item(s) to the institution system.

In an implementation, the amount of the purchase may be compared to a threshold amount, and if the threshold is exceeded, then the institution system may contact the user about insuring the item(s) associated with the purchase. Alternatively or additionally, the user may be contacted about insuring the item(s) if the merchant category code (MCC) of the purchase corresponds to one or more particular categories of goods and/or services.

In an implementation, the institution system may generate an inventory list of items purchased by the user with the financial card. The inventory list may be provided to the user. The user may revise the inventory list.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
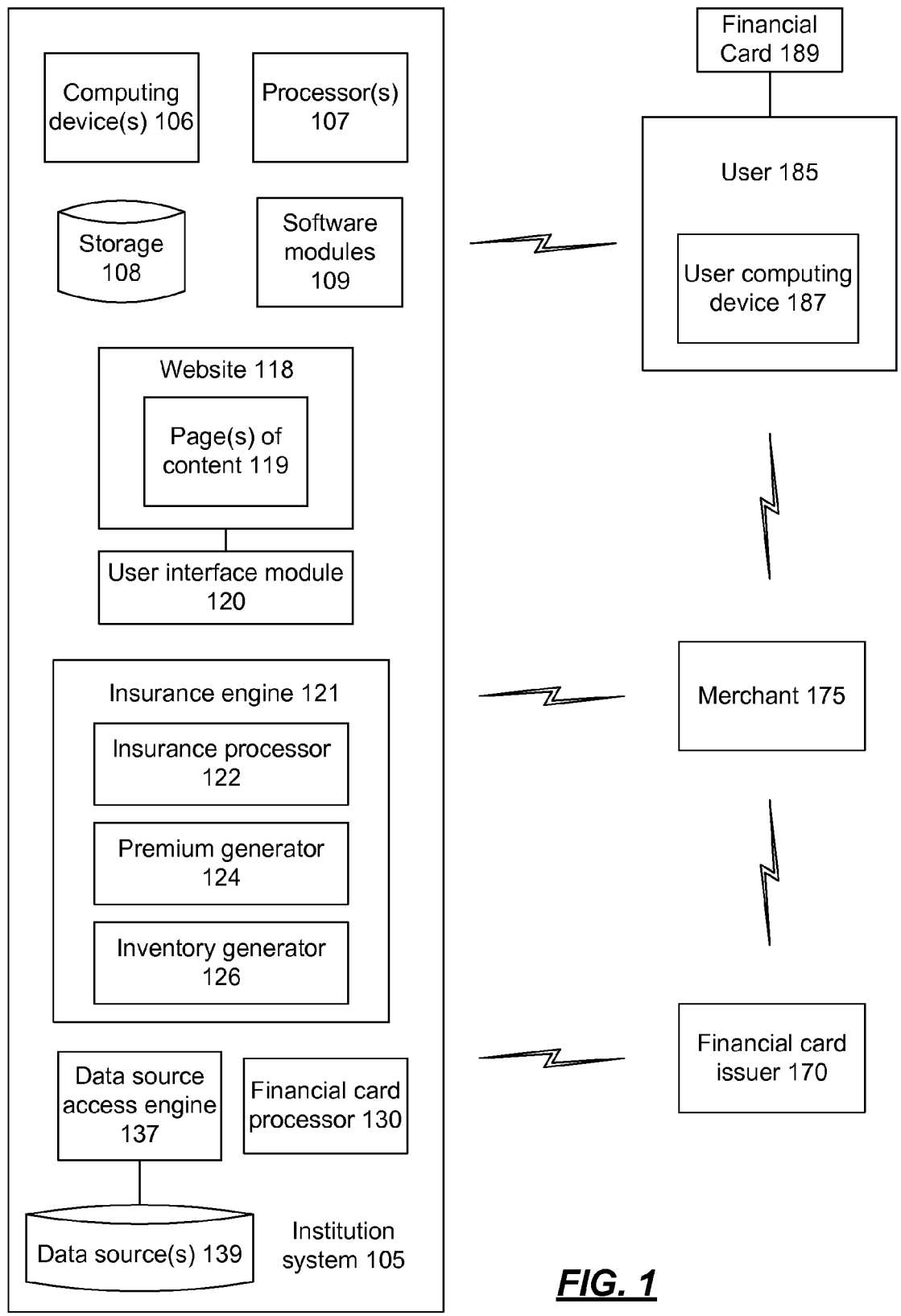
FIG. 1 is a block diagram of an implementation of a system that may be used to provide insurance coverage for a user purchase.

FIG. 1 is a block diagram of an implementation of a system that may be used to provide insurance coverage for a user purchase. An institution system 105 may be associated with an institution which may be any type of entity capable of providing an insurance policy. For example, the institution may be any type of insurance company, financial services company, etc.

A user 185 and an associated user computing device 187 are shown, along with a merchant 175 and a financial card issuer 170. The user 185 may make a purchase from the merchant 175 using a financial card 189 and insure item(s) associated with the purchase with the institution system 105. The financial card issuer 170 may issue the financial card 189 and/or process transactions associated with the financial card 189. The financial card issuer 170 may be an entity that provides services pertaining to aspects and behaviors of financial cards. It is contemplated that the institution system 105 may handle such aspects and/or behaviors of financial cards, and that the financial card issuer 170 may not be used.

The financial card 189 may be a credit card or a prepaid credit card for example. A credit card is a system of payment in which money is not removed from the user's account after every transaction. The financial card issuer 170, which may be an entity associated with the institution system 105 or a third party, lends money to the user 185 to be paid to the merchant 175. A prepaid credit card (referred to herein as a "prepaid card") is not really a credit card, as no credit is offered by the financial card issuer 170: the user 185 spends money which has been "stored" via a prior deposit by the user 185 or someone else, such as a parent or employer. However, it carries a credit card brand (e.g., Visa or MasterCard) and can be used in similar ways. After obtaining a prepaid card, the user 185 loads it with any amount of money and then uses the prepaid card to spend the money. In addition to a credit card or a prepaid card, the financial card 189 may be any type of payment device such as a debit card, a stored value card, a department store credit card, a mobile device, an RFID (radio-frequency identification) device, or a near-field communications device, for example.

The user 185 may use the financial card 189 to make a purchase at the merchant 175. As described further herein, the institution system 105 may receive and analyze transaction data associated with the purchase. The institution system 105 may send a notice to the user 185, e.g. via email, instant messaging, telephone, facsimile, mail, SMS (short message service), MMS (multimedia messaging service), a proprietary application residing on the user computing device 187, etc., asking if the user 185 would like insurance coverage for the item(s) pertaining to the purchase. The notice may request the user send a photo of the item(s) or documentation pertaining to the item(s) to the institution system 105. The notice may be sent to a computing device associated with the user 185, such as the user computing device 187.

The institution system 105 may include a user interface module 120, an insurance engine 121, and a data source access engine 137. The user interface module 120 may generate and format one or more pages of content 119 as a unified graphical presentation that may be provided to the user computing device 187 as an output from the insurance engine 121. In an implementation, the page(s) of content 119 may be provided to the user computing device 187 via a secure website 118 associated with the institution system 105.

In an implementation, instead of hosting the website 118, the institution system 105 may comprise a conventional application server hosting a proprietary online service accessible only by a private network. In any event, the institution system 105 may have appropriate security mechanisms in place to prevent unauthorized third parties from intercepting the user's information.

The user 185 may be an individual who owns an insurance product (also may be referred to herein as a policy) or other account that may be provided by or held by the institution associated with the institution system 105. The user 185 may provide data to the institution system 105 via the user computing device 187. The user computing device 187 may be a handheld computing device such as a personal digital assistant (PDA) or a mobile phone, for example, or any type of personal computer (PC). The user computing device 187 and the institution system 105 may be connected over a network. The user 185 may communicate with the institution system 105 by way of a communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. An example user computing device is described with respect to FIG. 6. The user 185 may also communicate with the institution system 105 by phone, email, instant messaging, facsimile, mail, and the like.

The merchant 175 may be any entity that may sell a product to the user 185. The user 185, as well as the institution system 105 and the financial card issuer 170, may be in communication with the merchant 175 via a communications network. During the authorization of a transaction, the merchant 175 may send data associated with the purchase, such as amount, merchant name, merchant category code (MCC), and financial card number, for example, to the financial card issuer 170 in an authorization message for verification and processing. An MCC is a number assigned to a business and is used to classify the business by the type of goods or services it provides. In an implementation, the authorization message may comprise additional data such as an itemized listing of the purchased items.

The institution system 105 may have the ability to interact with information that may be maintained and/or provided by the merchant 175, e.g., information pertaining to purchases made by the user 185. Additionally, the financial card issuer 170 and the user 185 may be in communication with the institution system 105 via a communications network.

In an implementation, the user 185 may provide photo(s) or documentation about the item(s) purchased that they would like to insure to the institution system 105. The user 185 may use an image generator, comprising a scanner for example, to generate a digital image of the item(s), receipt, proof of purchase, or other documentation. It is contemplated that any device that is capable of generating a digital image may be used to make the digital image(s). Additional devices that may be used in the generation of a digital image include a digital camera, a photocopier, a fax machine, and the like, for example.

The user 185 may transmit the digital image to the institution system 105 via the user computing device 187. The institution system 105 may use the digital image to generate or revise a premium quote for insuring the item(s) purchased by the user 185 or finalize insurance for the item(s). If a digital image is received, the insurance engine 121 may use any known image processing software or other application(s) to obtain the data from the digital image. The data may be used in the generation of a premium quote. Alternatively, the user 185 may provide the photo, receipt, proof of purchase, or other documentation about the item(s) to the institution system 105 by any other electronic or physical techniques.

As described further herein, the insurance engine 121 may receive the transaction data pertaining to the purchase, which may include a receipt, a proof of purchase, and/or other documentation, and generate a premium quote using a premium generator 124. The premium generator 124 may use any techniques(s) for generating a premium quote for insuring the item(s). The premium generator 124 may use data retrieved from data source(s) 139 by a data source access engine 137. Additionally, the premium generator 124 may request and receive information pertaining to the item(s) from the user 185 and/or the merchant 175. This information may be used in generation of the premium quote. After retrieving or otherwise receiving the data from the various sources, the premium generator 124 may use tools, applications, and aggregators, for example, to generate a premium quote for insurance of the item(s). The premium quote may be provided to the user 185, who may accept the premium quote.

The insurance engine 121 may comprise an insurance processor 122 that may receive and analyze transaction data as described herein. The insurance processor 122 may also send a request to the user 185 requesting instructions regarding insuring items the user may have purchased with the financial card 189. The insurance processor 122 may receive instructions from the user 185 and act on the instructions accordingly.

The insurance engine 121 may comprise an inventory generator 126 that may generate and maintain an inventory list of the items, as described further herein. The inventory list may comprise items purchased by the user 185 with the financial card 189, as well as items that the user may add to the inventory list, e.g., via the website 118.

The insurance engine 121 has access to data, files, and documents pertaining to the user 185 as well as any other data, files, and documents that are currently stored by the institution system 105 as well as external data, files, and documents and that may be useful in generating premium quotes, writing insurance policies, and maintaining inventory lists.

The institution system 105 has the ability to retrieve information from one or more data sources 139 via a data source access engine 137. Data pertaining to the user 185, the user's insurance policies, and/or the user account(s) may be retrieved from data source(s) 139 and/or external data sources. The retrieved data may be stored centrally, perhaps in storage 108. Other information may be provided to the institution system 105 from the user 185 and/or the merchant 175.

Data source(s) 139 may contain data, metadata, email, files, and/or documents that the institution system 105 maintains pertaining to the user 185, such as personal data such as name, physical address, email address, etc., insurance policy data such as items covered, premiums, and coverage amounts and limits, as well as other account information. The institution system 105 may access this information when generating premium quotes, writing insurance policies, or maintaining inventory lists, for example.

A user access system may be communicatively coupled to the insurance engine 121 and may be configured to send machine-readable instructions to the insurance engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to insurance and inventory data and status and related data can be accomplished. The user 185 may enter information into the web pages via a web browser on the user computing device 187. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules that may be used in conjunction with generating a premium quote and sending the premium quote to the user 185, issuing an insurance policy, maintaining an inventory list, generating web page content for display, and receiving instructions from the user 185, for example. While specific functionality is described herein as occurring with respect to specific modules, the functionality may likewise be performed by more, fewer, or other modules. An example computing device and its components are described in more detail with respect to FIG. 6.

Figure 2:
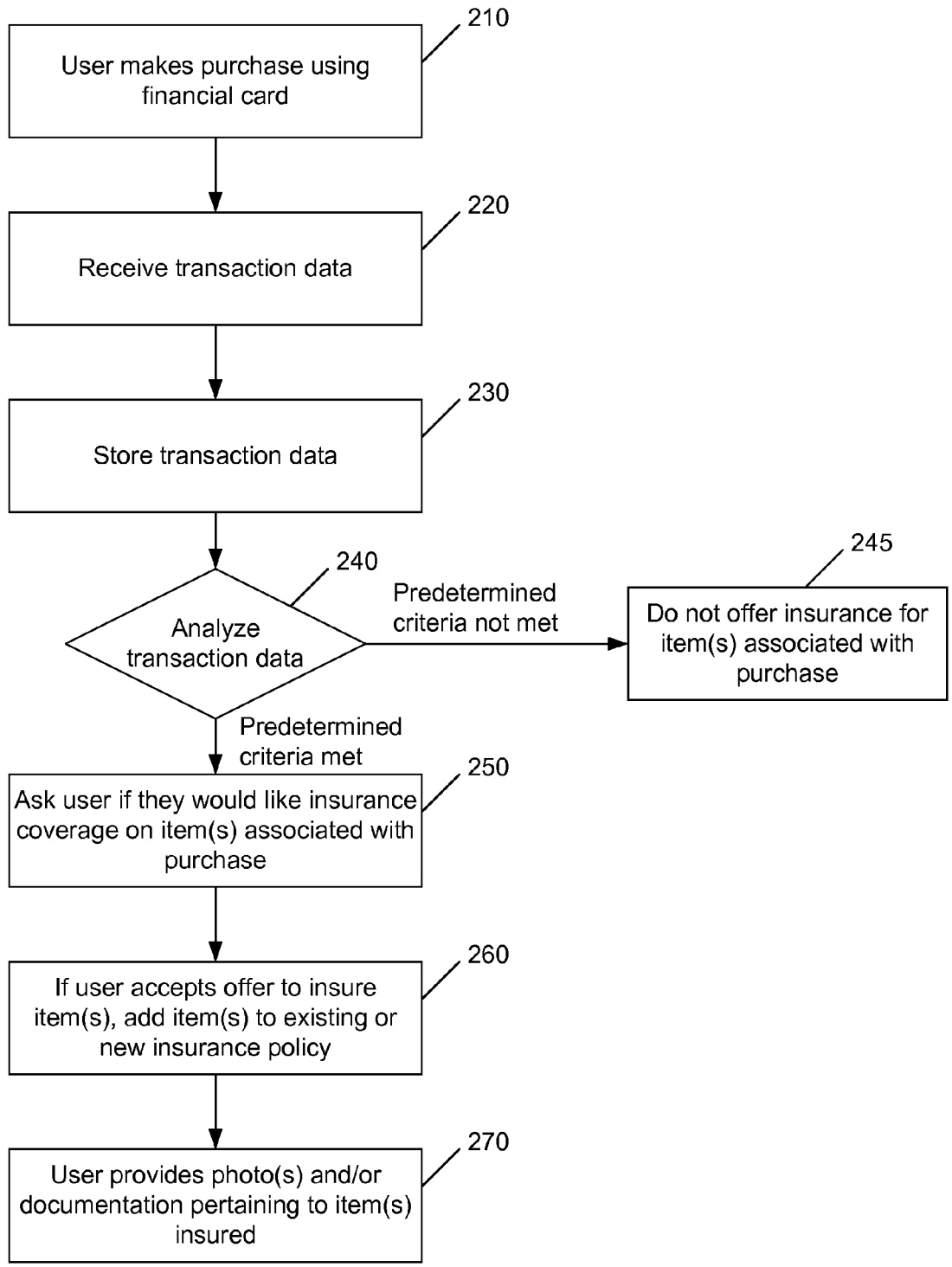
FIG. 2 is an operational flow of an implementation of a method that may be used to provide insurance coverage for a user purchase.

FIG. 2 is an operational flow of an implementation of a method 200 that may be used to provide insurance coverage for a user purchase. At 210, a user makes a purchase using their financial card. The institution system may receive transaction data at 220 and may store the transaction data at 230. The transaction data may comprise an amount of the purchase and an MCC, for example.

In an implementation, the institution system may have access to the transaction data because of a relationship the institution system has with the financial card issuer. Alternatively or additionally, the institution system may scrape the transaction data from a website associated with the financial card, provided the institution system has the appropriate credentials and/or authorization, e.g. provided by the user, the financial card issuer, etc.

At 240, the institution system may analyze the transaction data associated with the purchase against one or more predetermined criteria. If the predetermined criteria are met, then the institution system may contact the user at 250 and ask the user if they would like insurance coverage on the item(s) associated with the purchase e.g., by adding the item(s) to an existing insurance policy or purchasing a new insurance policy for the item(s). The institution system may contact the user via phone, email, instant messaging, and the like. The user may accept or decline the offer to insure the item(s). Assuming the user accepts, the institution system may add the item(s) to an existing insurance policy of the user or a new insurance policy at 260.

At some point, at 270, the user may provide one or more photos of the item(s) and/or documentation pertaining to the item(s) to the institution system to provide further evidence about the item(s) to the institution system. The user may use a digital camera, a phone, or any type of device or an image generator to generate a photo or digital image of the item(s) and/or the documentation. The user may provide the photo(s) and/or documentation by any electronic or physical techniques, such as email, via a website, mail, or facsimile. The photo(s) and/or documentation may be stored by the institution system and may be used in the generation or revision of a premium quote.

If the predetermined criteria are not met at 240, an offer to insure the item(s) associated with the purchase may not be generated or made to the user and processing may end at 245.

In an implementation, the institution system may generate a premium quote to insure the item(s) and may provide the premium quote to the user when asking the user if they would like insurance coverage on the item(s). Alternatively, the institution system may provide a premium quote to the user after the user accepts an offer to insure the item(s).

Regarding the predetermined criteria, in an implementation, the amount of the purchase may be compared to a threshold purchase amount (e.g., $500, $1000, etc.), and if the threshold purchase amount is exceeded, then the institution system may contact the user about insuring the item(s) associated with the purchase.

In an implementation, the user may be contacted about insuring the item(s) only if the MCC corresponds to one or more particular categories of goods and/or services. For example, if the MCC for a transaction corresponds to jewelry or retail electronics, then the user may be contacted about insuring the item(s) associated with the purchase; otherwise, the user may not be contacted.

In an implementation, an MCC may have a particular threshold purchase amount associated with it. If the threshold purchase amount for the MCC is exceeded by a purchase, then the user may be contacted about insuring the item(s). Different MCCs may have different threshold purchase amounts. For example, the MCC for retail electronics may have a threshold purchase amount of $500 and the MCC for jewelry may have a threshold purchase amount of $2000. Alternatively or additionally, the user may be contacted about insuring the item(s) if a threshold purchase amount is exceeded, regardless of the MCC. For example, if the amount of the purchase is greater than $5000, then the user may be contacted about insuring the item(s) regardless of the MCC that is associated with the transaction.

Figure 3:
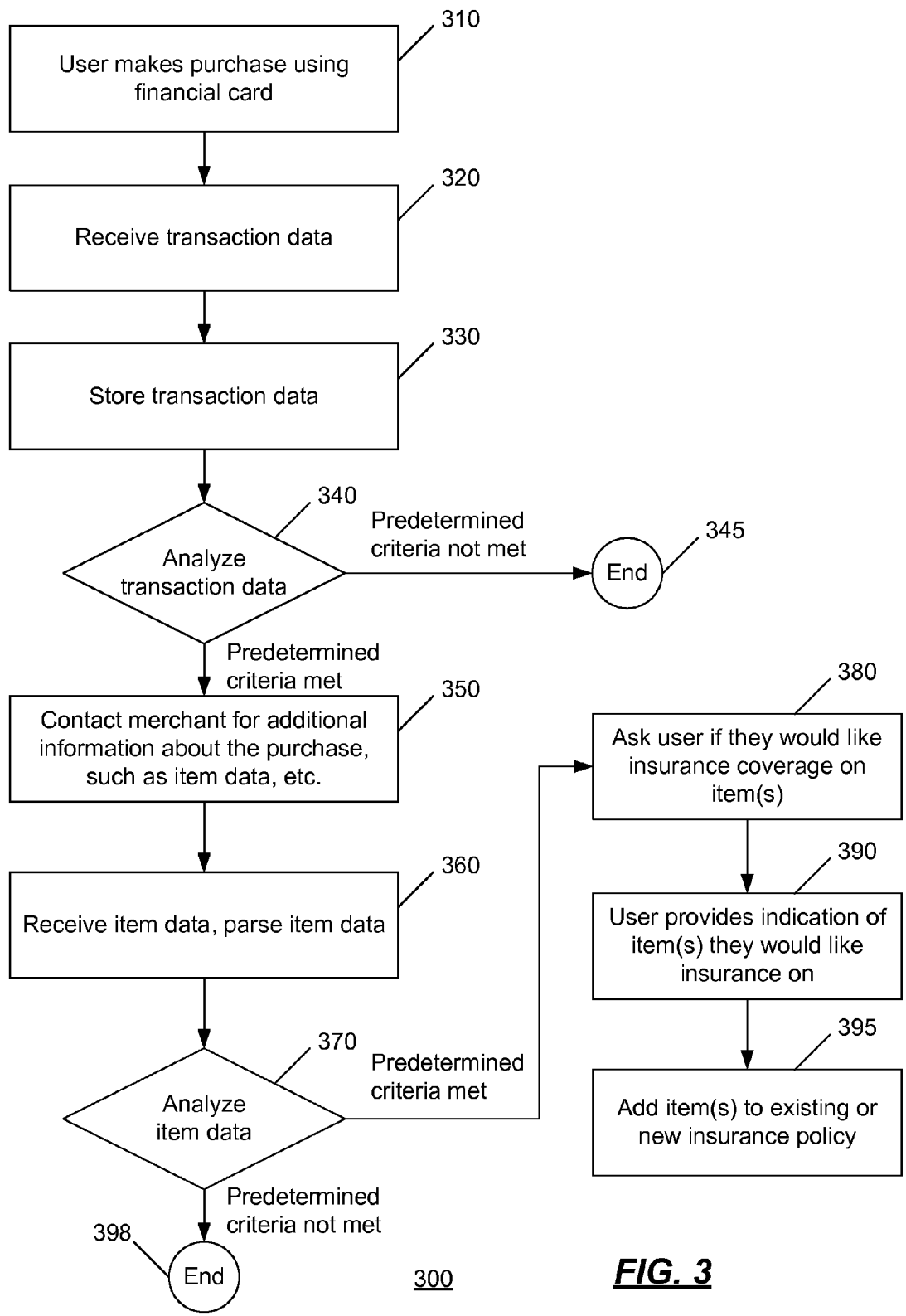
FIG. 3 is an operational flow of another implementation of a method that may be used to provide insurance coverage for a user purchase.

The institution system may obtain data from the merchant corresponding to the purchase, such as the particular items purchased and the purchase price of each item in the purchase. FIG. 3 is an operational flow of an implementation of a method 300 that may be used to provide insurance coverage for a user purchase. At 310, a user makes a purchase using their financial card. The institution system may receive transaction data at 320 and may store the transaction data at 330.

At 340, the institution system may analyze the transaction data associated with the purchase against one or more predetermined criteria, such as purchase amount and/or MCC. If the predetermined criteria are not met, processing may end at 345. If the predetermined criteria are met, at 350 the institution system may contact the merchant for additional information about the purchase, such as item data comprising the particular items purchased and their associated purchase prices.

At 360, the institution system may receive the item data and parse the item data for individual items in the purchase. At 370, the institution system may analyze the item data against one or more predetermined criteria, such as cost and/or product type, e.g. to determine which of the items may be protectable under an insurance policy that may be issued by the institution system to the user (e.g., a homeowner's policy of the user).

At 380, if the predetermined criteria are met, the institution system may contact the user and ask the user if they would like insurance coverage on the item(s) e.g., by adding the item(s) to an existing insurance policy or purchasing a new insurance policy for the item(s). The institution system may provide a premium quote for each of the items. The user may want insurance on one or more of the items and provide an indication to the institution system at 390, and the institution system may add the item(s) to an existing insurance policy of the user or a new insurance policy at 395.

If the predetermined criteria are not met at 370, an offer to insure the item(s) associated with the purchase may not be generated or made to the user and processing may end at 398.

Figure 4:
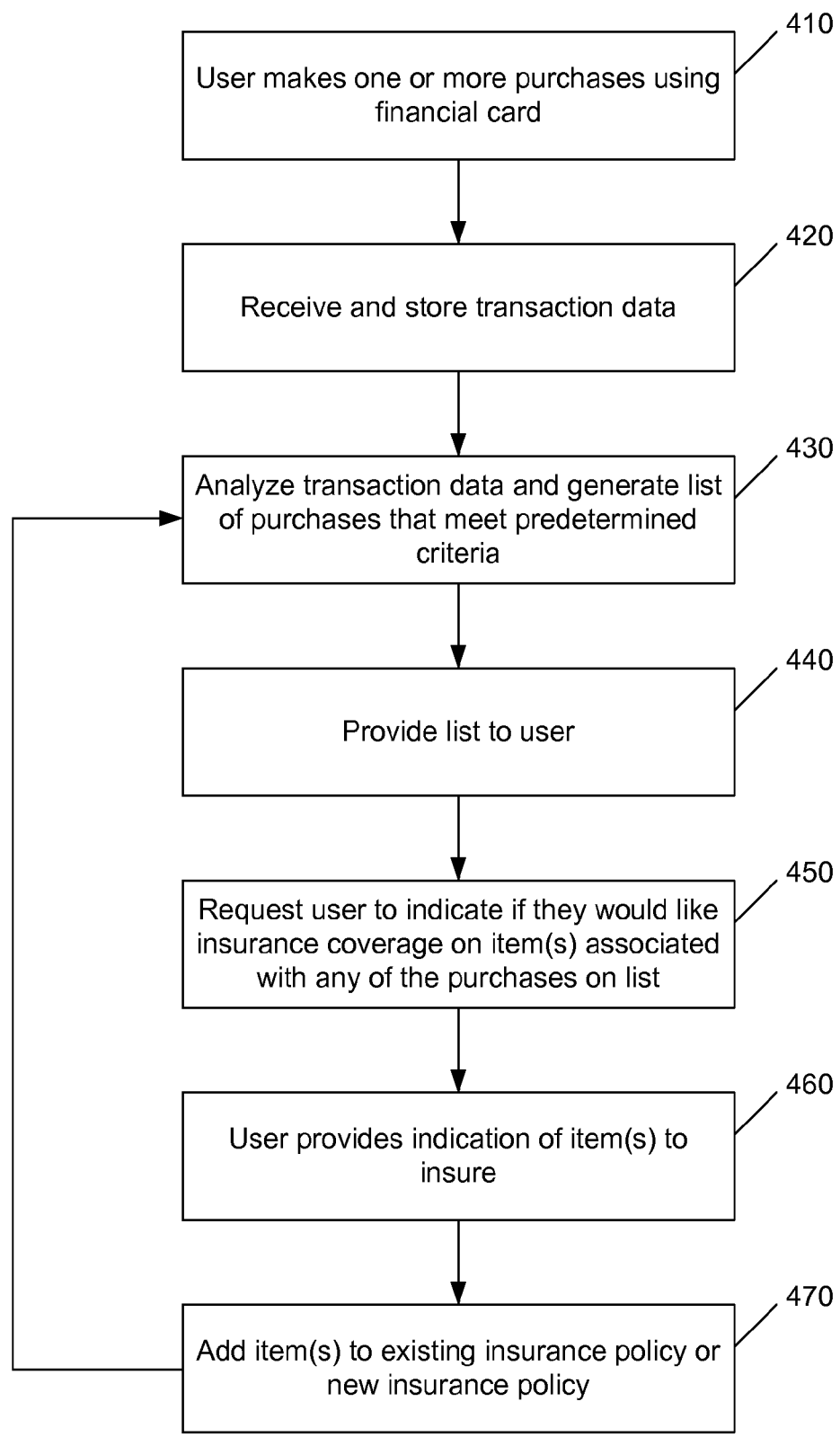
FIG. 4 is an operational flow of another implementation of a method that may be used to provide insurance coverage for a user purchase.

FIG. 4 is an operational flow of another implementation of a method 400 that may be used to provide insurance coverage for a user purchase. At 410, over a period of time, such as one day, one week, one month, etc., a user may make one or more purchases using their financial card. The institution system may receive and store transaction data for each of the purchases at 420.

From time to time, such as periodically (e.g., the first day of each month, the closing date of the financial card billing cycle, etc.), at 430, the institution system may analyze the transaction data associated with the purchases during the period of time against one or more predetermined criteria, and generate a list of the purchases made with the financial card that meet the predetermined criteria. The list may be provided to the user at 440, e.g. electronically or physically, e.g., by email, via a website, mail, facsimile, phone, etc. A request may be provided to the user at 450 to indicate if they would like insurance coverage on the item(s) associated with any of the purchases on the list (e.g., by adding the item(s) to an existing insurance policy or purchasing a new insurance policy for the item(s)).

At 460, the user may indicate which, if any, of the purchases on the list have one or more associated items that they would like to insure. The user may provide the indication to the institution system electronically or physically. The user may also provide information (e.g., photos, documentation, etc.) on the particular item(s) associated with the purchase(s) that they would like to insure. The institution system may add the item(s) to an existing insurance policy of the user and/or a new insurance policy at 470.

Figure 5:
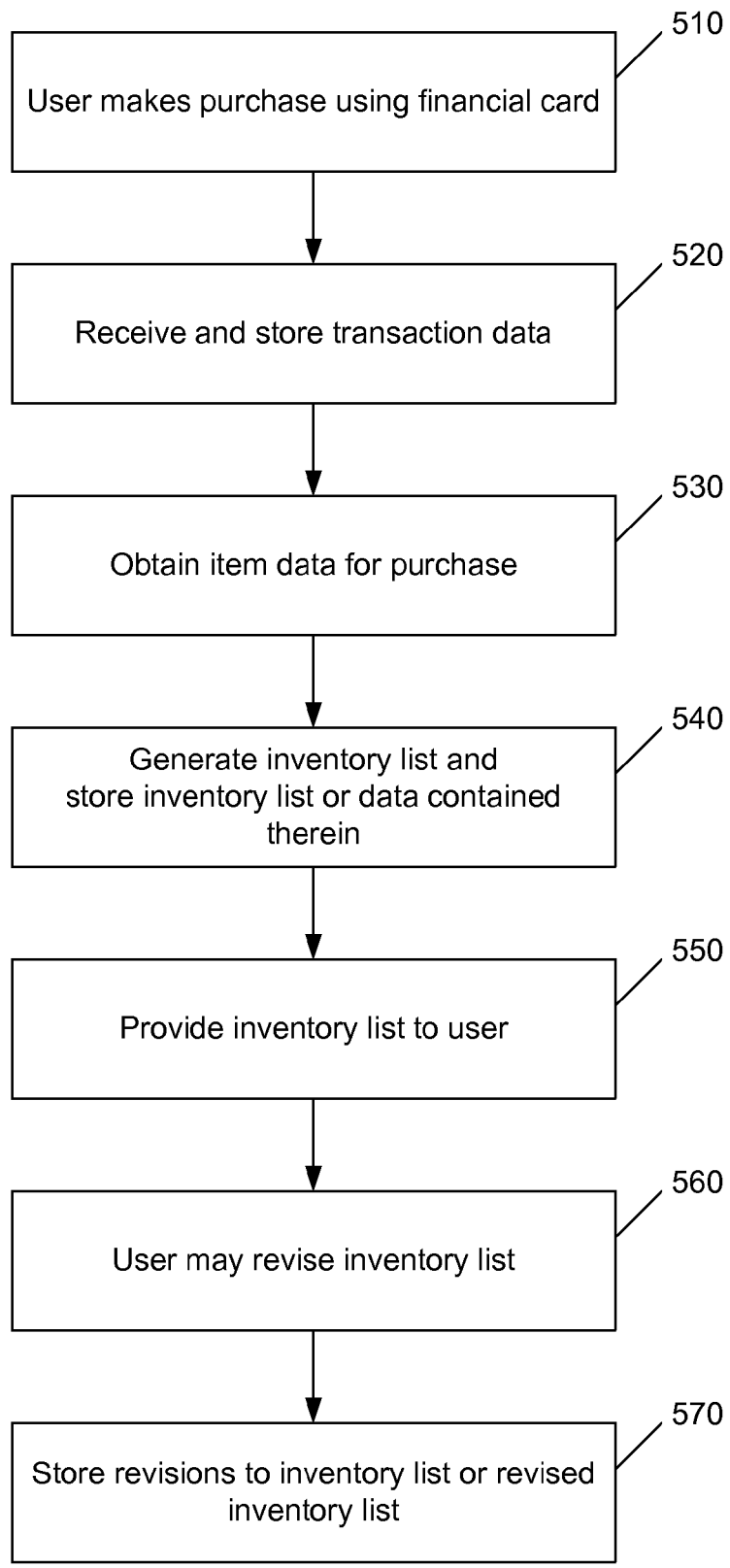
FIG. 5 is an operational flow of another implementation of a method that may be used to provide insurance coverage for a user purchase.

The transaction data may be used in the generation or updating of an inventory list that the institution system may maintain. FIG. 5 is an operational flow of another implementation of a method 500 that may be used to provide insurance coverage for a user purchase. At 510, a user makes a purchase using their financial card. The institution system may receive and store transaction data at 520.

At 530, the institution system may obtain item data for the purchase, e.g., by contacting the merchant associated with the purchase and/or by contacting the user. In an implementation, the institution system may request from the user and/or the merchant a list of the particular items that were purchased and their associated purchase prices. Alternatively or additionally, the institution system may ask the user for a copy (e.g., via facsimile or digital image sent by email or via a website) of the receipt associated with the purchase, and may use the receipt to identify the particular items that were purchased and their associated purchase prices.

In addition to using item data to revise or generate an insurance policy (e.g., as described above with respect to the methods 200, 300, and 400), the institution system may generate an inventory list of the user (e.g., a home contents inventory) at 540, and may store the inventory list or the data contained therein in storage associated with the institution system.

In an implementation, the inventory list may be provided to the user or may be accessible to the user at 550, e.g. via a website associated with the institution system. The inventory list may be provided to the user listed by subject matter (e.g., jewelry, electronics, etc.), by room in the house (e.g., living room, dining room, etc.), or by any other characteristic(s).

At 560, the user may revise the inventory list, e.g., by making additions, deletions, or other changes, and may add notes to the list, such as notes pertaining to the items on the list. The user may also indicate the location (e.g., the room of the house) of one or more items. The institution system may store the revisions and/or the revised inventory list at 570.

It is contemplated that the institution may use the item data in various analyses, such as determining risks and adjusting insurance rates accordingly, and maintaining a list of high risk items, such as hot oil cookers and propane tanks, for example.

Exemplary Computing Arrangement

Figure 6:
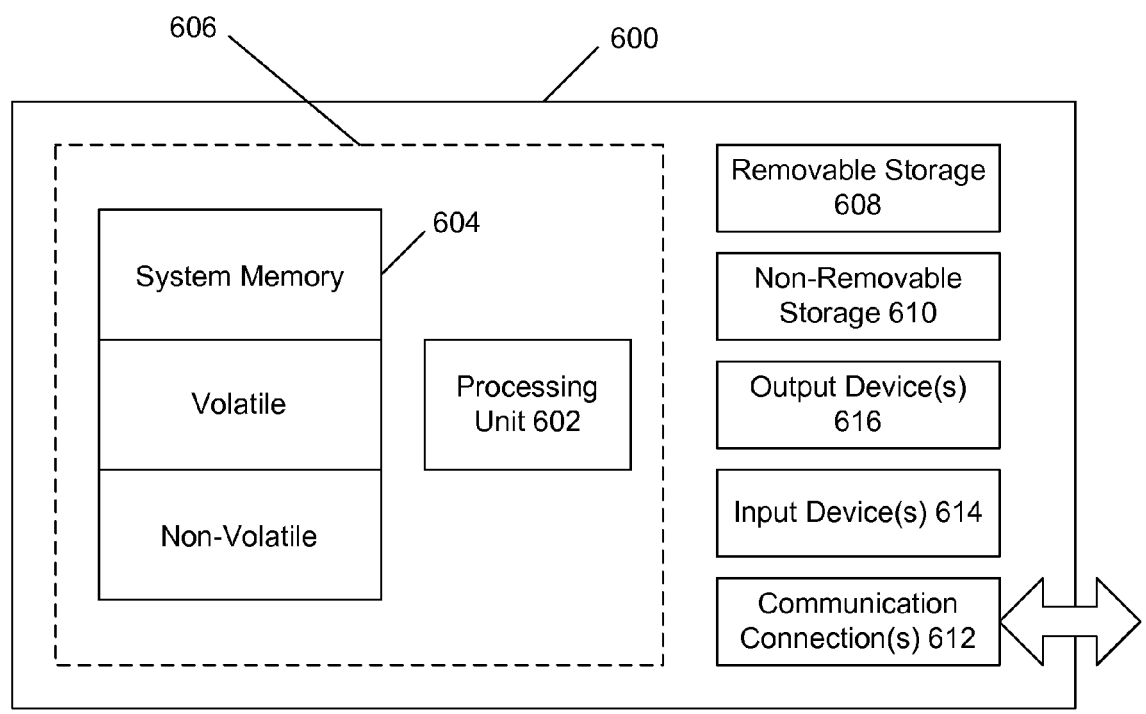
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An insurance method, comprising:
   providing a computer having an insurance processor;
   receiving, by the insurance processor, transaction data pertaining to a purchase of a plurality of items made by a user in a single transaction with a financial card, the transaction data comprising a purchase amount of the purchase;
   determining that the purchase amount of the purchase of the plurality of items made by the user in the single transaction exceeds a threshold purchase amount;
   receiving, by the insurance processor, item data about each of the plurality of items;

determining based on the item data by the insurance processor, which of the items purchased in the single transaction are protectable under an insurance policy; and insuring under the insurance policy the items that are protectable under the insurance policy, by the insurance processor.

2. The method of claim 1, further comprising requesting the item data responsive to receiving the transaction data.

3. The method of claim 2, further comprising analyzing the transaction data with respect to at least one predetermined criterion, and only requesting the item data if the at least one predetermined criterion is met.

4. The method of claim 1, further comprising requesting the item data from the user.

5. The method of claim 1, further comprising requesting the item data from a merchant associated with the purchase.

6. The method of claim 1, wherein the insurance policy is a homeowner's policy of the user.

7. The method of claim 1, wherein insuring the items comprises adding the items to an existing insurance policy of the user.

8. A computer-readable medium comprising computer-readable instructions for insurance, said computer-readable instructions comprising instructions that:

receive transaction data pertaining to a purchase of a plurality of items made by a user in a single transaction with a financial card, the transaction data comprising a purchase amount of the purchase;

determine that the purchase amount of the purchase of the items in the single transaction exceeds a threshold purchase amount;

receive item data about each of the items;

determine based on the item data, which of the items purchased in the single transaction are protectable under an insurance policy; and insure under the insurance policy the items that are protectable under the insurance policy.

9. The computer-readable medium of claim 8, further comprising instructions that request the item data responsive to receiving the transaction data.

10. The computer-readable medium of claim 9, further comprising instructions that analyze the transaction data with respect to at least one predetermined criterion, and only request the item data if the at least one predetermined criterion is met.

11. The computer-readable medium of claim 8, further comprising instructions that request the item data from the user.

12. The computer-readable medium of claim 8, further comprising instructions that request the item data from a merchant associated with the purchase.

13. The computer-readable medium of claim 8, wherein the insurance policy is a homeowner's policy of the user.

14. The computer-readable medium of claim 8, wherein the instructions that insure the items comprise instructions that add the items to an existing insurance policy of the user.

15. An insurance system, comprising:

at least one subsystem that receives transaction data pertaining to a purchase of a plurality of items made by a user in a single transaction with a financial card, the transaction data comprising a purchase amount of the purchase;

at least one subsystem that determines that the purchase amount of the purchase of the items in the single transaction exceeds a threshold purchase amount;

at least one subsystem that receives item data about each of the items;

at least one subsystem that determines based on the item data, which of the items purchased in the single transaction are protectable under an insurance policy; and at least one subsystem that insures under the insurance policy the items that are protectable under the insurance policy.

16. The system of claim 15, further comprising at least one subsystem that requests the item data responsive to receiving the transaction data.

17. The system of claim 16, further comprising at least one subsystem that analyzes the transaction data with respect to at least one predetermined criterion, and only requests the item data if the at least one predetermined criterion is met.

18. The system of claim 15, further comprising at least one subsystem that requests the item data from the user.

19. The system of claim 15, further comprising at least one subsystem that requests the item data from a merchant associated with the purchase.

20. The system of claim 15, wherein the insurance policy is a homeowner's policy of the user.

21. The system of claim 15, wherein the at least one subsystem that insures the items comprises at least one subsystem that adds the items to an existing insurance policy of the user.

* * * * *